United States Patent [19]

Kim

[11] Patent Number: 4,709,294

[45] Date of Patent: Nov. 24, 1987

[54] DEVICE FOR CONTACT PROTECTION AND ARC PREVENTION OF A SWITCH

[76] Inventor: In Suk Kim, 134-21, Cheongdam-dong, Kangnam-ku, Samik Apt., 10-Block No. 615, Seoul, Rep. of Korea

[21] Appl. No.: 769,877

[22] Filed: Aug. 27, 1985

[30] Foreign Application Priority Data

Aug. 27, 1984 [KR] Rep. of Korea .................... 84-5220
Jun. 21, 1985 [KR] Rep. of Korea .................... 85-4424

[51] Int. Cl.[4] .................................. H02H 9/02

[52] U.S. Cl. ........................ 361/58; 200/144 AP; 361/10; 361/126

[58] Field of Search ................ 200/144 AP; 361/58, 361/126, 10

[56] References Cited

U.S. PATENT DOCUMENTS 3,395,316 7/1968 Denes et al. ............... 200/144 AP

FOREIGN PATENT DOCUMENTS 0072566 2/1983 European Pat. Off. ..... 200/144 AP
526029 3/1976 U.S.S.R. .................... 200/144 AP
0849327 7/1981 U.S.S.R. .................... 200/144 AP
0917224 3/1982 U.S.S.R. .................... 200/144 AP

*Primary Examiner*—Robert S. Macon
*Attorney, Agent, or Firm*—Birch, Stewart, Kolasch & Birch

[57] ABSTRACT

A device for preventing contact defacing and arc prevention which comprises a triac bearing a momentary opening or shutting of a current, fixed terminals (A) and (B) bearing the continuous current, further in the terminals (A) and (B) no arc occurring at opening and closing, therefore a silver contact becomes unnecessary.

5 Claims, 13 Drawing Figures

DEVICE FOR CONTACT PROTECTION AND ARC PREVENTION OF A SWITCH

BACKGROUND OF THE INVENTION

The present invention relates to a device for preventing contact and arc prevention in a switch, more particularly to a centrifugal switch for use in starting of an induction motor.

In the prior art, a centrifugal force device of a centrifugal switch is used as it is, and it is connected in parallel with a triac only at a contact spot, further a triac takes full charge of a current burden of a contact and the centrifugal switch bears only a delicate current so as to give a trigger to the triac further. In order to solve the problem regarding centrifugal switch which is caused by a damage or a friction loss of a contact a current conducted to the triac (T1), further a current and a condenser which is connected to a winded auxiliary wire in series are connected the triac (T2), afterward the triacs (T1) and (T2) are arranged in parallel and connected to a condenser and a resistance in series, further it is connected with a switch and a resistance between the triac (T2) and a gate.

Thus, in the prior art, the triac bears a load current fully, therefore it must use a triac with a large volume under a load of a large current, as the result of the above mentioned a cooling plate also becomes larger as well as a triac volume, therefore it is not economical, and it causes a problem upon a installing place as the size of a device is large, in view of the matters a method which increases a contact volume without use of a triac is considered to be more useful.

The present invention will be described in detail referring to the attached drawings hereinafter.

SUMMARY OF THE INVENTION

A device for preventing contact defacing and arc prevention in a switch which comprises a insulating plate, a right fixed terminal (A) disposed at the right end portion of the insulating plate (1), said right fixed terminal (A) being connected to an auxiliary winded wire (L3) which extends to a power source terminal (8), and a second triac ($T_2$), a left fixed terminal (B) disposed at the left end portion of said insulating plate (1), said left fixed terminal (B) being connected to a power source terminal (9) and a first triac (T1), a fixed terminal (C) disposed intermediate said terminals (A) and (B) and on the opposite sides of said insulating plate said center fixed terminal (C) being connected to a triac gate (G) disposed between the first and second triacs ($T_1$) and ($T_2$) through a resistance (R), and a movable plate (6) attached to the insulating plate (1), a switching knob (10) connecting the movable plate (6) to the insulating plate (1), said switching knob (10) in turn being connected to the centrifugal switch of a motor, whereby in operation the right fixed terminal (A) and second triac (T2), are first connected to the center fixed terminal (G) and triac gate (G), and then are connected to the left fixed terminal (B) and first triac (T1) for the prevention of arcing and contact defacing when the current is cut off.

BRIEF DESCRIPTION OF THE DRAWINGS

FIG. 2-1 is a perspective view of an assembly of FIG. 2;

FIGS. 2-2, 2-3 and 2-4 are a schematic circuit diagram of the present invention;

FIGS. 3, 4 and 5 are the schematic diagram of another embodiments of the present invention;

DETAILED DESCRIPTION OF THE PRESENT INVENTION

Figure 1:
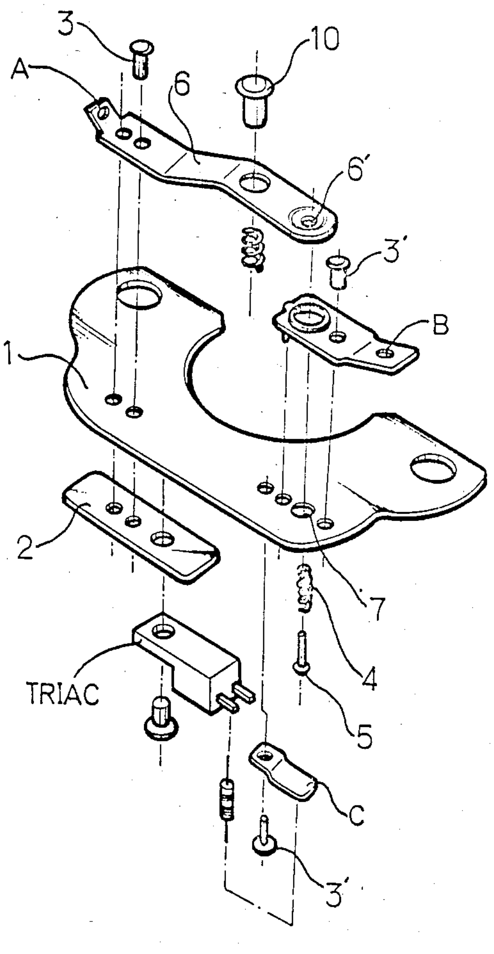
FIG. 1 is an exploded perspective view of the present invention.
Figure 2:
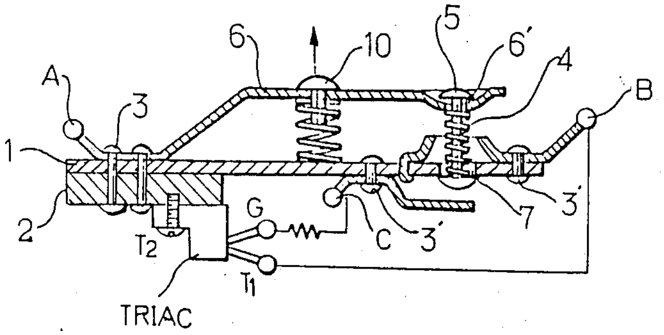
FIG. 2 is a an exploded
Figures 1, 2:
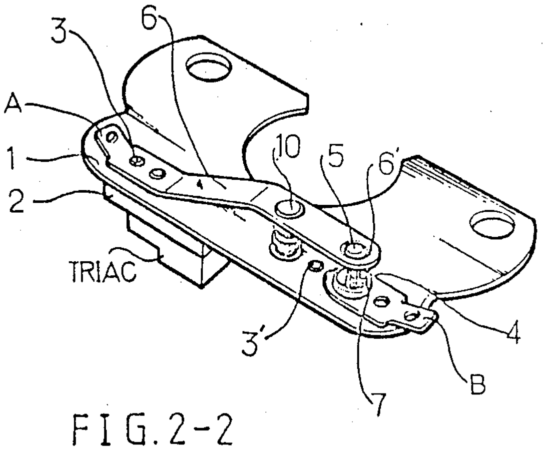
Figure 2:
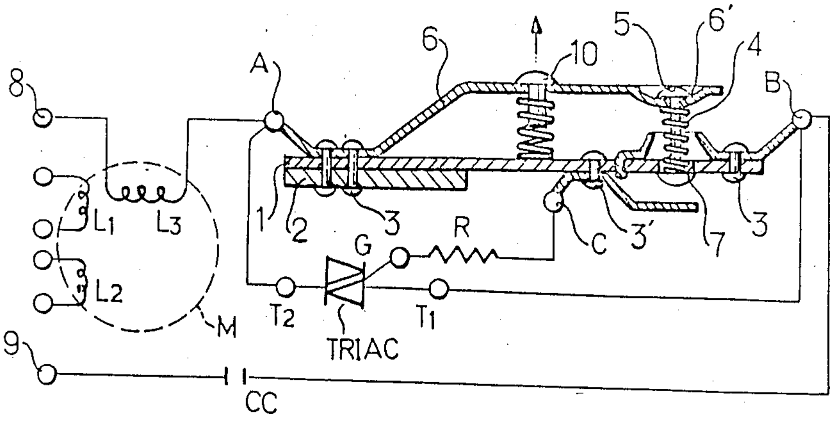
Figures 2, 3:
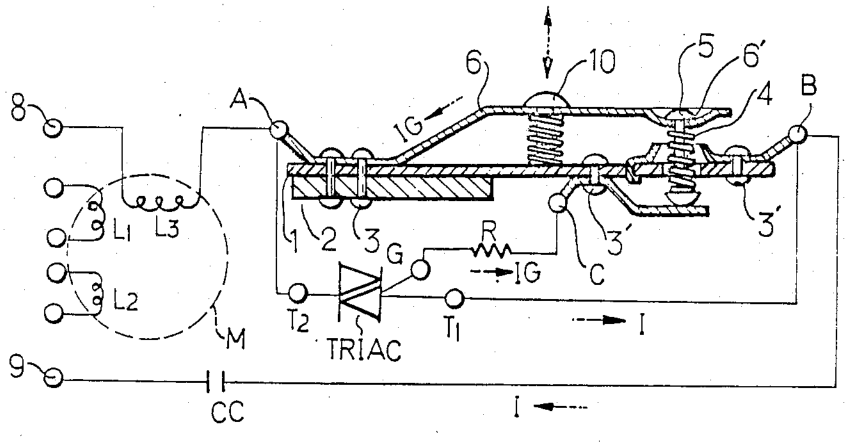

FIG. 1 is an exploded perspective view, FIG. 2 is a cross-sectional view of FIG. 1, FIG. 2—1 is a perspective view of FIGS. 2 and FIGS. 2-2, 2-3 and, 2-4 illustrate an electric circuit diagram.

However, one end of an auxiliary wound wire (L3) which is used for starting a motor (M) is connected to a power source (8), and the other end is connected to a fixed terminal (A) provided with a plate spring which is fixed to an insulation plate 1 for use fixation. Further, a triac (T2) is connected to the fixed terminal (A), and a triac (T1) and a power source (9) are connected to a fixed terminal (B) formed with a plate spring. The terminal (B) is connected to the power source (9) through a starting condenser (CC).

Further a terminal (C) is positioned between the terminal (A) and (B), and it is connected to a gate (G) of the triac through a resistance (R). Further, an insulation material of a centrifugal device of the motor is provided so as to remove or connect a knob (10) for use in opening and closing.

Accordingly, when the power source is switched "ON" to the main wound wires (L1, L2) and auxiliary a wound wire (L3), then a centrifugal force generated by means of the rotation of the motor (M) become weak. As the result a insulation material pushes the opening-shutting knob (10). Accordingly the fixed terminal (A) is connected to the terminal (C) in advance, further a trigger current (IG) flows at the gate G of the triac through the resistance (R), further the load current flows therein, next the fixed terminal (A) is connected to the fixed terminal (B), thus the fixed terminal (A),(B),(C) are all connected, further the load current (1) does not flow into the triac because of a internal resistance of the triac, but flows through the fixed terminal (A) and (B).

Figures 2, 3, 4:
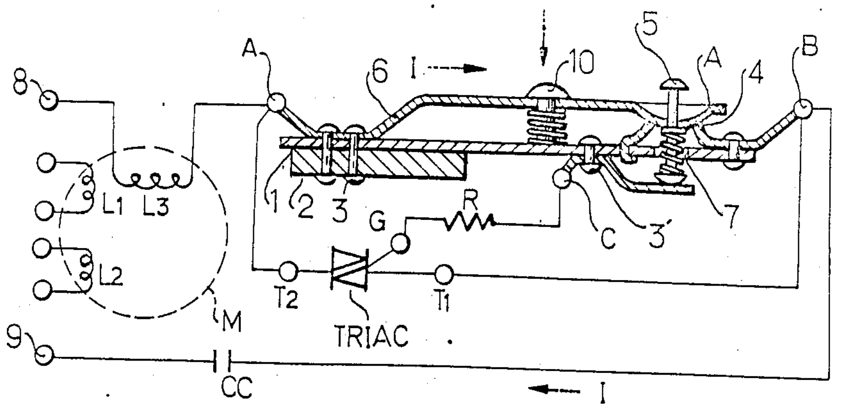
Figure 3:
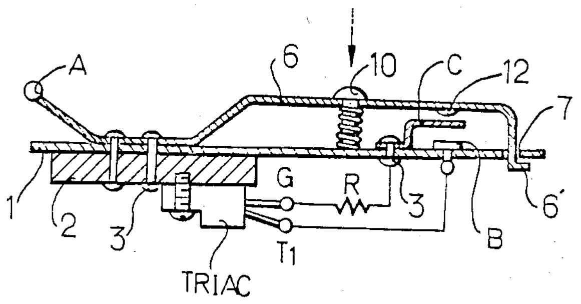
Figure 4:
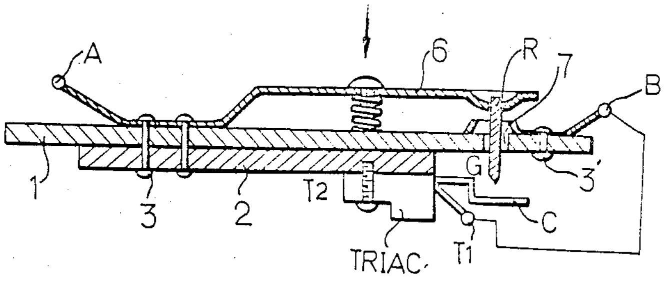

Namely, when the motor (M) stopps, the opening-shutting knob (10) is pushed since there is no centrifugal force, therefore the fixed terminal (A) is pushed into as the direction indicated by an arrow as shown in the FIG. 2–4, thus the fixed terminals (A),(B) and,(C) are connected mutually, if the power source is conducted the current terminals (8) and (9), further the motor then starts since the auxiliary wound wire (L3) for use starting is conducted to the power source, thus according to an original starting a centrifugal force is generated in the centrifugal switch, further the insulation material is pushed to the motor's side, accordingly the terminal (A) retreats also to the direction indicated with an arrow, consequently the terminals (A) and (B) are separated in advance, further the fixed terminals (A) and (C) are still connected, therefore the triac is conducted continuously by means of the gate current (IG) in the triac gate, consequently there is no occurence of a spark discharge between the fixed terminals (A) and (B). Accordingly a damage or a friction loss of the contact does not occur.

Further the centrifugal switch is pulled more to the side of the motor (M) according to becoming a normal operating condition of the motor (M), further it is pushed to the side of the motor (M) under the situation in which the fixed terminal is pushed, therefore the fixed terminal (A) is separated from the fixed terminal (C), consequently the gate current (IG) does not flow therein, accordingly the triac is changed into "OFF" and the current (I) also does not flow in the auxiliary wound wire (L3) for use starting.

At this time, the gate current (IG) which flows in the gate triac is a delicate and disregarded current, accordingly it is possible to prevent a damage of the auxiliary wound wire (L3) for use starting without any occurence of a damage or firction loss between the fixed terminals (A) and (C).

Further if the current is cut off at the main wound wires (L1)(L2) under such a starting condition, then on the contrary to the starting time, the fixed terminal (A) is connected to the fixed terminal (C). Accordingly the gate current (IG) gives a trigger to the triac gate, thus the triac (T1) and (T2) are conducted, at this time the terminal (A) is not yet connected, therefore it can provides a preparatory condition to supply a current to the auxiliary wound wire wound (L3) for use starting.

Thus, when the power source becomes "ON" then the terminals (A) and (C) are connected in advance, next the terminals (A) and (B) are connected, when it is changed in "OFF", on the contrary, the terminals (A) and (B) are separated, in advance, next the terminals (A) and (C) are separated, further the stationary switch circuit bears the load current (I) only in the instant (in several cycles) in which the terminals (A) and (B) are regulated in "ON" or "OFF", further an arc occurence between the contacts is protected, accordingly it is enough to provide a volume which can endure the surge current in the triac.

Accordingly it becomes a small volume thereof and a cooling plate is also unnecessary, further it can be placed in the terminal (A) side by side, therefore it is possible to reduce a space smaller the existing opening-shutting switch, consequently it can omit a silver contact cost and an arc extinquish device.

The preferred embodiments of the present invention are shown in the FIG. 2 to FIG. 5 which utilize the principle of the present invention.

In an example shown in the FIG. 2, the terminal (A) is formed with the movable plate (6) which is formed with a plate spring, further at the one end of the movable plate (6) is fixed to the insulating plate (1) with the pin-type piece (3) together with the indirectly-heated plate as the triac (T2), and at the other end of the movable plate (6) which is connected to the terminal (A). A I-shaped movable pin (5) which is installed elastically is supported and the hole (6') is disposed therein, further it projects downward of the hole (7) which is disposed at the insulating plate (1).

Further, the terminal (B) is disposed on the upper edge of the hole (7) so as to avoid to contact electrically and directly with the movable plate (5), at the lower side of the hole (7) the terminal (C) in which the I-shaped movable (5) is separated or connected is fixed to the insulating plate (1) with a piece (3'), the gate (G) of the triac is connected to the fixed terminal (C) through the resistance (R), and the triac (T1) is connected the fixed terminal (B) which is disposed at the upper edge of the insulation plate at which the hole (7) is provided.

In the example, a movable pin (5) lies in a separated situation by means of the coil spring (4) commonly, further it lies also in the same situation as the above mentioned by means of the elasticity of the movable plate (6), that is to say, it is the situation in which the motor rotates normally.

Such a centrifugal switch lets the power source of the motor (M) change into "OFF" under the huddling condition of the centrifugal switch, and if it is stopped, then the insulation material pushes the opening-shutting knob (10) which is installed to the movable plate of the terminal (A) as the direction indicated by an arrow as shown in FIG. 2-3, accordingly the movable pin (5) which is installed elastically to the movable plate (6) is connected to the terminal (C) in advance, accordingly the I-shaped type movable pin (5) appears upward of the hole (6') over a tension of the coil spring (4) when the insulation material pushes the movable plate (6) more, further the movable plate (6) becomes in a situation in which it is connected with the terminal (B), as shown in FIGS. 2–4 the terminals (A)(B) and (C) stay in the situation in which they are all connected.

Accordingly, when the power source is conducted again, then the insulation material uses as the direction indicated by an arrow as shown in FIG. 2-4, consequently the movable plate (6) is separated from the terminal (B), further the movable pin (5) which is connected to the terminal (C) is also separated, like the above mentioned the current (I) which flows in the winded wire (L3) for use starting is cut off.

Referring in detail to FIG. 3, an end (6") of the movable plate (6) is inserted through the hole (7) of the insulation plate (1), and the movable plate (6) is stopped so as to limit to go up more, further the terminals (B) and (C) are disposed on the upper side of the insulation plate (1), however, the terminal (C) is disposed between a projecting contact point ($T_1$) and the terminal (B). In the above mentioned, the motor (M) operates normally, the projecting contact point (11) of the movable plate (6) is connected to the terminal (C), in advance, next the terminals (A) and (C) are connected to the terminal (B), when it is conducted, on the contrary, the terminals (A) and (C) are separated from the terminal (B), afterwards the terminal (A) is separated from the terminal (C) again.

Accordingly, at this time, the current to the winded wire (L3) for use starting is cut off, therefore the motor (M) works normally.

Another embodiment of the present invention is illustrated in FIG. 4. Namely, instead of using the "I type" movable pin (5) and the coil spring (4), the resistance member (R) is fixed to the hole (6') of the movable plate (6) at a right angle, and it is adapted to contact the plate spring terminal (C) which is effective in resisting extension through the hole (7). The action of this embodiment is the same as the working example in the FIGS. 1–3.

Figure 5:
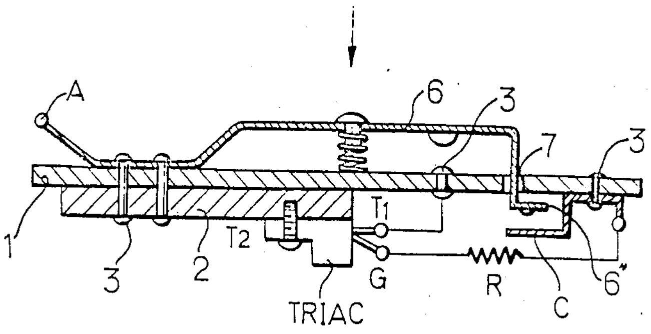

Further, the FIG. 5 shows another embodiment of the present invention, in which the terminal (C) is connected to the bottom of the end (6") of the movable plate (6).

The above mentioned embodiment is easily understood by the experts that it is able to install corresponding to a centrifugal switch of an induction motor.

Furthermore the present invention can be applied not only for a centrifugal switch but also for an electromagnetic switch, a knife switch and an arc protection device of a non-fuse breaker.

Figure 6:
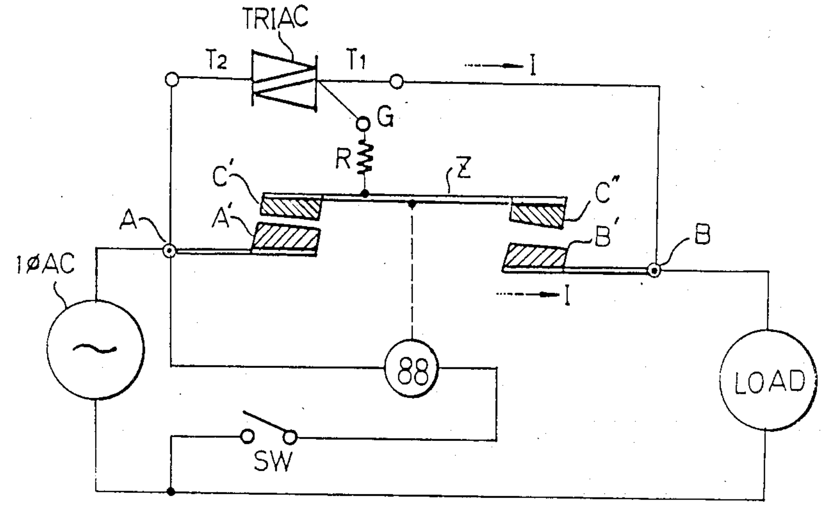
FIG. 6 is a schematic circuit diagram showing an electromagnetic switch with a single electrode of the presnet invention.
Figure 7:
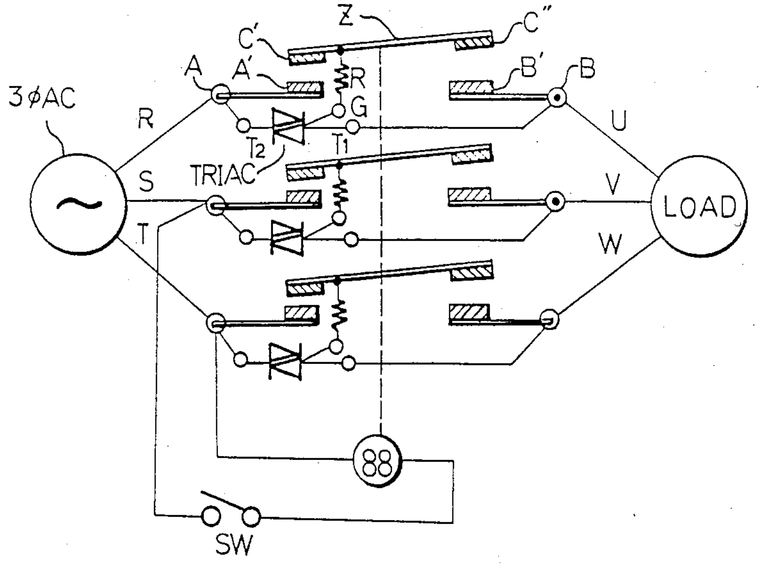
FIG. 7 is a schematic diagram showing a three-phase switch of another embodiment of the present invention.
Figure 8:
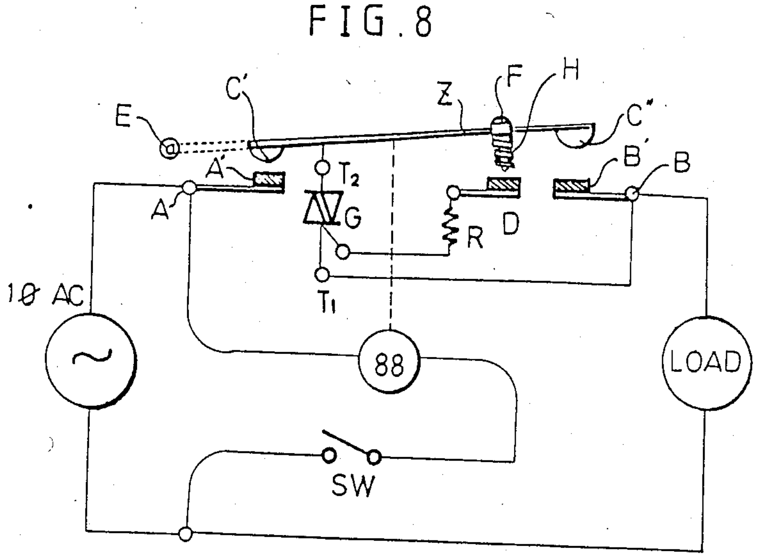
FIG. 8 is a schematic diagram of another embodiment of the present invention.
Figure 9:
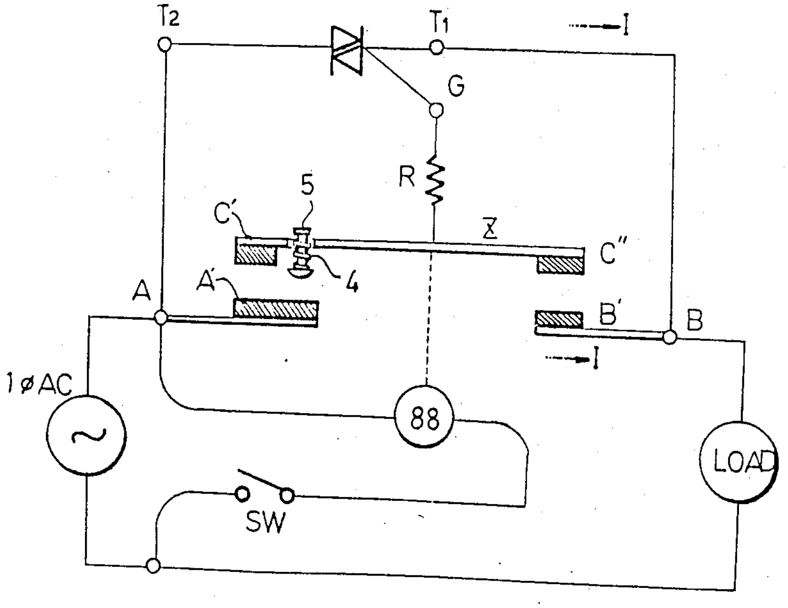
FIG. 9 is a schematic diagram showing a switch without the arc in magnetic switch of the present invention.

In the present invention there is also other embodiment of the present invention which comprises a simple switch without arc. It will be described hereinafter. The FIG. 6 is a schematic circuit diagram of a electromagnetic switch and the FIG. 7 is schematic diagram in which a three-phase electromagnatic switch . FIG. 8 shows also other embodiment of the present invention, further the FIG. 9 illustrates a switch without arc in a magnetic switch, they will be described in detail hereinafter.

1φAC is a single-phase power source, 3φAC is a three-phase power source, R, S, T are, respectively, a terminal in the three-phase electromagnetic switch power source, U. V. M are, respectively, a terminal in an electromagnetic switch load, further instead of a silver contact point of the electromagnetic switch, a triac is used, and the triac (T2) is connected to the fixed terminal (A), and the triac (T1) is connected to the fixed terminal (B) in the load, further (G) is connected to the movable piece (Z) respectively, It is devised with a structure in which a distance between contact point (A′) and contact (C′) is narrower than a distance between contacting member (B′) and contacting member (C″) so as to make the fixed terminal contact (A′) of the fixed terminal (A) and a movable contact (C′) of the movable piece (Z) to be connected earier than a fixed terminal contact (B′) of the fixed terminal (B) and a movable contacting member (C″) of the movable piece (Z) of the other side, when a power source is supplied to the switch coil 88 by means of a switch then the movable piece (Z) is inhaled, and the contacting member (A′) and the contact (C′) are connected in advance, further the contacting member (A′) and contacting member (C′) are connected, in advance. Accordingly the triac is blocked, then the load current (I) flows through the triac, further the contacting members (B′) and (C″) are connected momentarily, therefore the load current (I) flows through the switch contacting members (A′)(C′) and contacting members (B′)(C′), consequently there occurs almost no current flow since the internal resistance is large in comparison with the contact.

When it is regulated in "ON", on the contrary, if the contacting members (B′) and (C″) are opened in advance, then the load current (I) flows momentarily through the triac, next, when the contacting members (A′) and (C′) are changed in "OFF", then the gating of the triac is interupted, accordingly the current through the triac is also interupted, consequently the current flow is cut off.

However, the current which flows in the triac is a surge current which is a momentary current (in several cycles), thus it plays a role to prevent arc, as the result, a burden upon a current becomes few, and a cooling plate is also unnecessary, accordingly it will be enough with a small volume.

Referring to in detail to the FIG. 6, in order to apply the principle of present invention for one-pole electromagnetic switch the contact member (C′) of the movable piece and contacting member (C″) are connected to the contacting member (A′) and (B′) in the difference of time by means of the structure which is arranged so as to give a difference of the unevenness between the contacting members (A′) and (B′). In the FIG. 7, in order to apply the principle of the present invention for a R-phase, S-phase and T-phase of the three-pole switch, the triac is installed, and it is wired as shown in the FIG. 6, further, it does not give an unevenness between the contacting member (A′) of the fixed terminal (A) and the contacting member (B′) of the fixed terminal (B) and instead of keeping it the same height the movable piece (Z) is inclined a little bit to the movable piece contact (C′) then the electromagnetic switch is regulated in "ON" by means of the switch (SW), if it inhales, the movable piece (Z), then the contacting member (A′)(C′) are connected, in advance, accordingly, the static switch circuit is formed, then the current (I) flows through the triac, next the contacting member (B′) and (C″) are connected, the current (I) flows the passageway of the contacting member (A′) and (C′), the movable piece (Z), and the contacting member (C″) and (B′), the current flow is cut off, in the triac. When it is separated, on the contrary to the connection, the contacting member (B′) and (C″) are separated in advance, the momentary current is born by the triac, next the contacting member (A′) and (C′) are separated, consequently, the gate current of the triac is interupted, accordingly the current (I) is also cut off completely.

Thus, by an opening or shutting of a switch the arc generated at the contact is inhaled at the triac, further the contact is formed considering the shape so as to keep a good connection and is treated with a plating, as the result of the above mentioned, it does not need any expensive silver contact or an alloy treatment, further it can prevent various disasters such as a damage and a frition loss of a motor, a fire, a tremble at opening-shutting and occurence of noise.

In the FIG. 8, the triac is disposed on the movable piece, the triac (T2) is connected to the movable piece (Z) and the triac (T1) is connected to the terminal (B) in the load, and gate (G) is connected to the other terminal (D) through the resistance (R) again, further the movable pin (5) which is provided with the spring (4) is connected near the contacting member (C″) of the movable piece, further, when a switch is regulated in "OFF", then a structure in which the power source terminal (A) and the load terminal (B) are opened completely is formed in order to keep safety in case a triac is bad, when the coil (88) is excited by switching of the switch (SW), then the movable piece (8) is inhaled, and the contacting member (C′) and (A′) are connected, at first, next the movable pin (5) and the gate terminal (D) are connected, accordingly, the triac is conducted thereof, afterwards the contacting member (C″) and contact (B′) are connected, then the triac is short-circuited, consequently the triac conduction is interupted immediately. In the case, the coil is become "OFF" and accordingly, the switch is opened, on the contrary to an opening time of the switch the contacting member (B′) and (C″) are opened in advance, next, the movable pin (5) and the gate terminal (D) are separated, finally, the contacting members (C′) and (A′) are separated, and the triac bears a burden of the current only, in a moment of the separation, therefore there occurs no arc, and also there is no any burden since a commen operating current flows into the following step: that is, terminal (A)→starting piece (Z)→passageway of the terminal (B).

The FIG. 9 shows a switch without an arc upon a common magnetic switch. The switch without are in case a movable pin (5) in which a spring is provided to an exsisting magnetic switch without settling a slope or a difference of unevenness.

When the examples of the present invention, there occur arc occurence at a contact of a switch since it becomes a zero-voltage Accordingly the expensive silver contact is not necessary therefore, further the arc chute is also unnecessary. And there occur no tremble at opening-shutting and occurence of noise, further according to the present invention it is possible to provide an almost semipermanent switch, and it can contribute thereof to an industrial development.

What is claimed is:

1. A device for preventing contact defacing and arc prevention in a switch which comprises:

a insulating plate, a right fixed terminal (A) disposed at a right end portion of the insulating plate (1), said right fixed terminal (A) being connected to an auxiliary winded wire (L3) which extends to a power source terminal (8), and a second triac (T2), a left fixed terminal (B) disposed at a left end portion of said insulating plate (1), said left fixed terminal (B) being connected to a power source terminal (9) and a first triac (T1), a fixed terminal (C) disposed intermediate said terminals (A) and (B) and on the opposite sides of said insulating plate, said fixed terminal (C) being connected to a triac gate (G) disposed between the first and second triacs ($T_1$) and ($T_2$) through a resistance (R), a movable plate (6) attached to the insulating plate (1), and a switching knob (10) connecting the movable plate (6) to the insulating plate (1), said switching knob (10) in turn being connected to the centrifugal switch of a motor, whereby in operation the right fixed terminal (A) and second triac (T2), are first connected to the center fixed terminal (C) and triac gate (G), and then are connected to the left fixed terminal (B) and first triac (T1) for the prevention of arcing and contact defacing when th current is cut off.

2. The device of claim 1 wherein the movable plate (6) is provided with a pin (5) which slidably extends through a hole (6') disposed at the right end portion thereof, said pin adapted to further extend through an aperture (7) disposed in the insulating plate (1) whereby the pine (5) can contact the fixed terminal (C) disposed on the opposite side of the insulating plate.

3. A device for preventing contact defacing and arc prevention in a switch which comprises:

a right fixed terminal (A) having a terminal contacting member (A') disposed at one end portion thereof, a left fixed terminal (B), a first triac ($T_1$) connected to the left fixed terminal (B), said left fixed terminal (B) having a terminal contacting member (B') disposed at one end portion thereof, a second triac ($T_2$) connected to a movable piece (Z), said movable piece (Z) having contacting members (C') and (C'') disposed at respective end portions thereof for contacting members (A') and (B') whereby the distance between the terminal contacting member (A') and contacting member (C') is narrower then that between the terminal contacting member (B') and contacting member (C''), and a triac gate (G) disposed between first and second triac $T_1$ and $T_2$, through a resistance (R), whereby the terminal contact (A') is first connected to the contacting member (C') and then the terminal contract (B') is connected to the contacting member (C'').

4. The device of claim 3 wherein the movable piece (Z) is provided with a power source circuit and a load circuit which are completely isolated from each other.

5. The device of claim 4 wherein the movable piece (Z) is provided with a spring biased pin (F) disposed at right end portion thereof.

* * * * *